United States Patent [19]
Hernandez

[11] Patent Number: 4,577,817
[45] Date of Patent: Mar. 25, 1986

[54] THREE-DIMENSIONAL VACUUM ENVELOPE

[75] Inventor: Santiago Hernandez, Anaheim, Calif.

[73] Assignee: Gulf & Western Manufacturing Company, Southfield, Mich.

[21] Appl. No.: 561,415

[22] Filed: Dec. 14, 1983

[51] Int. Cl.⁴ ............................................... B64D 17/50
[52] U.S. Cl. .................. 244/148; 206/524.8; 383/38
[58] Field of Search ............... 244/147, 148; 206/524.8; 383/38, 40; 229/87.5, 5.6, DIG. 3, DIG. 4

[56] References Cited

U.S. PATENT DOCUMENTS

| | | | |
|---|---|---|---|
| 2,519,923 | 8/1950 | Noelcke, Sr. | 244/148 |
| 2,576,322 | 11/1951 | Waters | 206/524.8 |
| 3,087,696 | 4/1963 | Sepp, Jr. | 244/148 |
| 3,584,815 | 6/1971 | Stencel | 244/149 |
| 3,712,568 | 1/1973 | Grasso et al. | 244/148 |
| 3,851,814 | 12/1974 | Stage | 229/DIG. 3 |
| 4,146,133 | 3/1979 | Bogorad et al. | 229/DIG. 3 |
| 4,457,730 | 7/1984 | Foster et al. | 441/42 |

FOREIGN PATENT DOCUMENTS 3036796  1/1983  Fed. Rep. of Germany ........ 441/94

*Primary Examiner*—Galen L. Barefoot
*Assistant Examiner*—Rodney Corl
*Attorney, Agent, or Firm*—A. Thomas Kammer

[57] ABSTRACT

A three-dimensional vacuum envelope is provided for storing compressible articles and particularly survival equipment such as a parachute. It includes upper and lower walls of flexible, substantially gas-impermeable material. One of the upper and lower walls includes an integral loop defining a pouch in fluid communication with the remainder of the envelope. The pouch is pivotable with respect to the envelope and may be used for containing parts which must be independently maneuverable even after storage and evacuation.

16 Claims, 6 Drawing Figures

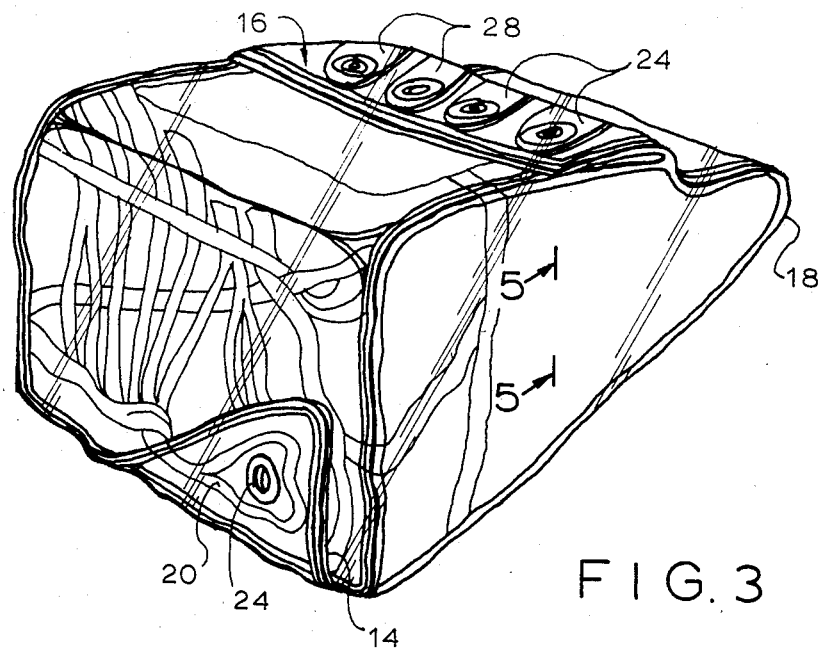
FIG. 3
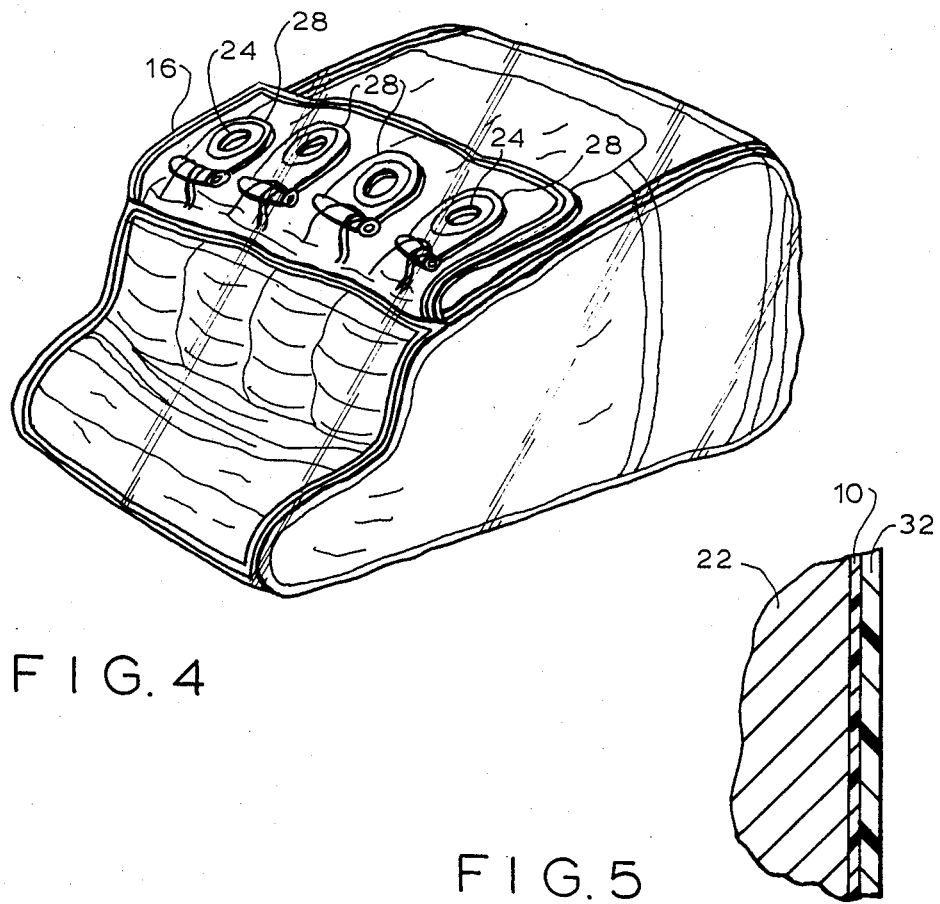
FIG. 4
FIG. 5

THREE-DIMENSIONAL VACUUM ENVELOPE

BACKGROUND OF THE INVENTION

1. Field of the Invention

The field of the invention concerns a vacuum-sealable envelope capable of containing objects of unusual size or shape.

2. Brief Description of the Prior Art

Vacuum packaging has been employed to advantage where an article must be stored in a minimal amount of space. This is a particularly important consideration in the storage of survival equipment such as parachutes. In aircraft equipped with ejection seats, parachutes are stored in containers known as head boxes. These are relatively small due to the limited amount of space available. Similar problems are encountered in the storage of life rafts, sleeping bags, and other such articles in an aircraft.

If an article is of unusual shape, it may be difficult to position it within an envelope unless the envelope is of excessive size. This not only wastes material, but increases the bulk of the overall package.

U.S. Pat. Nos. 3,584,815 and 3,712,568 both disclose vacuum-packed parachutes. The former is deployed by means of a pyrotechnic fuse.

SUMMARY OF THE INVENTION

A vacuum envelope having three-dimensional properties is provided for accomodating objects of unusual size and/or shape. The envelope is constructed from two plies of a flexible and substantially gas-impermeable material. The plies are overlapped, and one is pulled up to form a loop extending perpendicularly with respect to the other. The edges of the plies are then sealed to each other to create an envelope. This envelope will include at least two portions: one between the ajacent plies and another defined by the loop. Additional loops could be provided if necessary.

The envelope is particularly suitable for storing a parachute. The transfer links of the parachute are inserted into the loop while the canopy and other rigging remain between the plies. After evacuation, the transfer links will remain maneuverable with respect to the remainder of the package so that they may easily be connected to the aircrewman.

BRIEF DESCRIPTION OF THE DRAWINGS

FIG. 3 is a front perspective view of a vacuum packed parachute;

FIG. 4 is a rear perspective view thereof;

FIG. 5 is a fragmentary sectional view thereof taken along the plane of line 5—5 in FIG. 3.

DETAILED DESCRIPTION OF THE INVENTION

An assembly is provided for the storage of compressible survival equipment such as parachutes, life rafts, and sleeping bags. While each of these items may include non-compressible components, they are for the most part compressible to a great degree and attain full recovery upon release of pressure applied thereto. The constructions shown in FIGS. 1–5 are essentially the same as that shown in commonly assigned U.S. Ser. No. 525,574 filed Aug. 22, 1983.

Figure 1:
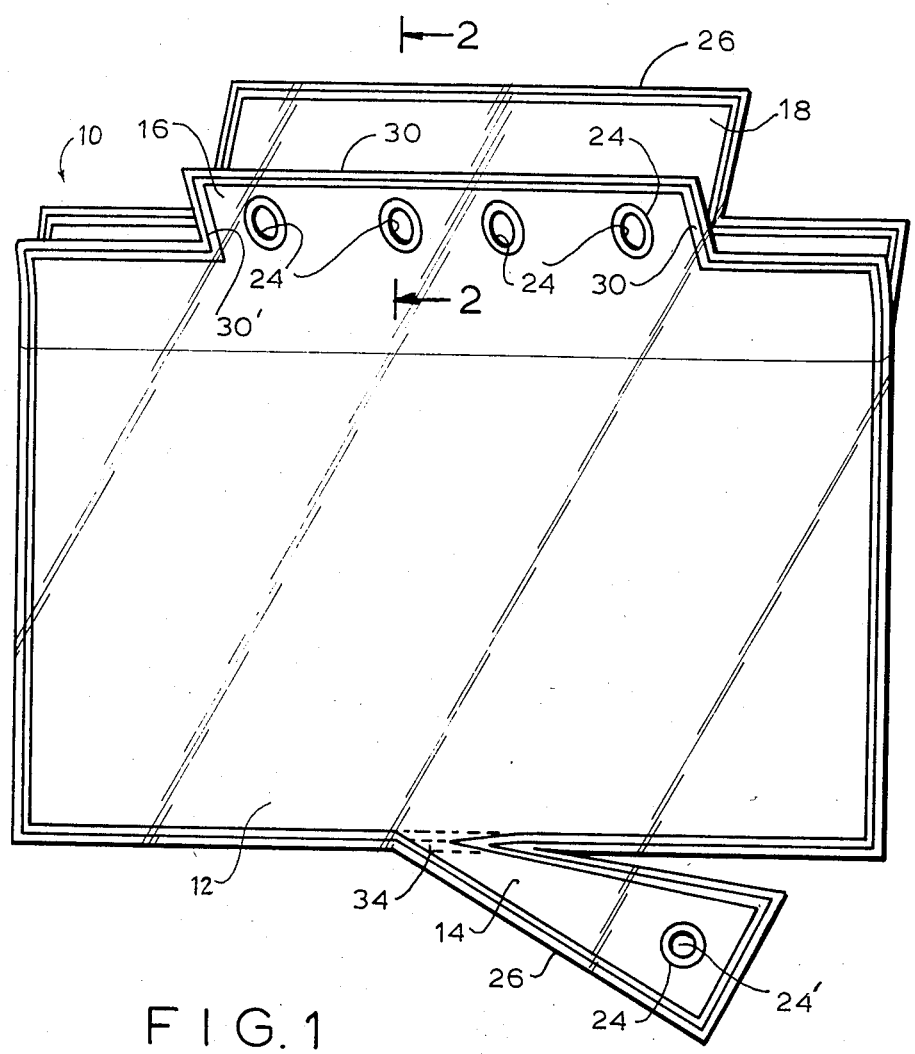
FIG. 1 is a top perspective view of a vacuum envelope according to the invention.
Figure 2:
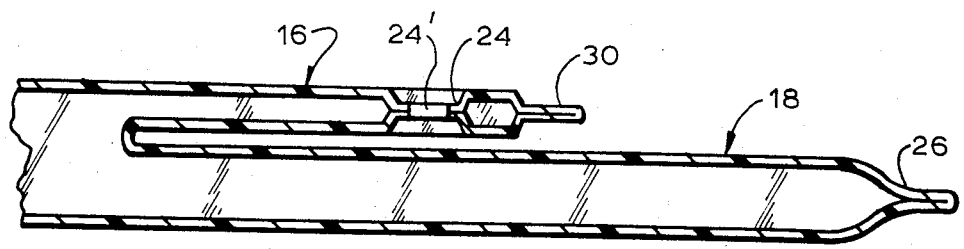
FIG. 2 is a sectional view thereof taken along the plane of line 2—2 in FIG. 1.

FIGS. 1 and 2 illustrate an inner vacuum envelope 10 specifically designed for accomodating a parachute. The parachute has been removed from the envelope for purposes of clarity. The vacuum envelope is made from a relatively thin, extremely low gas transmission fabric. A one hundred gauge nylon film bonded to a 2.25 mil film called "Saranex 12" has been found to provide excellent results. "Saranex" films have been recognized for their low gas permeability. Their use in the food packaging industry is discussed, for example, in U.S. Pat. No. 4,105,818. Nylon is known for adding durability and puncture resistance. A nylon film is employed for this purpose in the prior art laminate illustrated in U.S. Pat. No. 3,912,843.

It is very important that the inner envelope be quite thin for purposes of the present invention. Since an uncompressed piece of equipment must be inserted therein, it must be of sufficient size to accomodate it without undue stress being placed thereon. When the equipment is compressed and the envelope evacuated, there is a considerable amount of excess material drawn tightly against the exterior surface of the equipment. Since it is relatively thin, it does not add significantly to the dimensions of the compressed,, evacuated assembly.

The outer envelope is substantially the same in configuration as the inner envelope and is designed to fit about it. Since it must only accomodate a greatly reduced volume, it may be constructed from a tougher, heavier material which will provide greater resistance to punctures or tears. In furtherance of this objective, the outside envelope material is constructed from the same Saranex/nylon material used for the inner envelope to which is bonded a 10 mil film of MP-1880 Polyurethane (J. P. Stevens & Co., Inc.). This 10 mil film is bonded to the nylon side of the substrate. One side of the polyurethane is provided with a matte finish.

The polyurethane adds toughness, tear resistance, greater flex-life, puncture resistance and low temperature flexibility to the outer envelope. The absence of plasticizers or fillers therein insures that flexibility and toughness will be maintained for years. It is not particularly gas impermeable, however, and is accordingly bonded to a material having this property.

Each envelope is radio frequency heat sealed along a selected perimeter. The inner envelope material is folded or otherwise arranged such that the Saranex is on the inside. Saranex, a film composed of polyvinylidene chloride coated on both sides with polyethylene, is sealable to itself in such a manner. The nylon side is neither capable of sealing to itself nor to the Saranex.

The Saranex side of the outer envelope is also sealed to itself as it is desirable to position the tough polyurethane surface on the outside. The locations of the seals on the outer envelope correspond to those on the inner envelope as will be explained hereinafter.

A vacuum-packed assembly according to the present invention is manufactured in the following manner. The item to be packed is folded into a desired configuration. The inner envelope is heat sealed along certain lines leaving an opening which is large enough to receive the folded item easily. This opening is sealed once the item is inserted. A small opening should still be present through which the envelope can be evacuated. The item is compressed to a fraction of its original size and air is evacuated from the envelope. Once this procedure is complete, the small evacuation opening is sealed. The result is a relatively small, dense package encased in a thin, tightly adhered skin. This package is placed within the outer envelope which has been partially heat sealed in a manner corresponding to that of the inner envelope. If the inner package includes projecting portions, the outer envelope is designed to receive these portions. The package and outer envelope are positioned relative to each other so that this occurs. Once the opening through which the package is inserted is sealed, the outer envelope is evacuated to form a tough outer skin on the evacuated assembly. The evacuation opening is sealed to provide the finished product.

It will be appreciated that the vacuum-packed assembly may take any of a number of forms depending upon the item to be packed and the configuration of the receptacle into which it must fit. The method for deployment of the item is another factor which influences the design of the assembly. An example of a specifically shaped envelope and assembly including a parachute is provided in the drawings.

The inner envelope 10 shown in FIG. 1 includes a main body portion 12, an actuation neck 14, a pouch 16, and an extending end portion 18. With the exception of the pouch 16, the envelope is two-dimensional and may be laid flat.

Since a parachute must be deployed rapidly, the envelope must be designed to be torn apart quickly and easily when certain forces are applied thereto. As mentioned above, it must otherwise be resistant to punctures, tears, and environmental conditions. The actuation neck 14 is accordingly designed to receive the fabric bridle 20 of the parachute 22 which connects the top of the canopy to the drogue parachute (not shown). The bridle 20 includes a loop through which external connection is made. A circle weld 24 is formed within the loop in the actuation neck of the inner envelope and the center thereof removed. The outer envelope also includes a circle weld (seal) inside that of the inner envelope with the center removed. External connection with the loop is made by passing a member through the removed portions 24' of the envelopes and the bridle loop. The circle welds insure vacuum integrity is maintained in both envelopes. It will be appreciated that closed loop welds of other configurations could alternatively be employed at any location on the envelopes.

The neck 14 extends at an acute angle with respect to the main body 12 of the envelope. The heat seals 26 defining the borders of the neck 14 and body 12 also intersect at an acute angle. A wedge-shaped portion of the vacuum envelopes between the neck and body is removed to provide a sharp point from which the envelopes will tear through the seals when the drogue parachute pulls upon the neck. This point may be located where the intersecting seals adjoin.

The pouch 16 is used for containing four male transfer links 28 of the parachute. These links are color coded to identify whether they should be connected to the corresponding female receiver links of the front or rear risers. By employing such a pouch to accomodate the links, there is no undue stress upon the vacuum envelopes as the male links therein are maneuvered to be secured to the receiver links. An additional heat seal 30 extends across the top of the pouch to provide greater rigidity.

To form the pouch 16 in the inner envelope, a pair of overlapping sheets (or one folded over sheet) of vacuum envelope material is placed on a flat surface. A loop of desired size is then formed in the top sheet and folded down flat. The edges of the sheets, including the loop, are then heat sealed. Since the exterior surfaces of the sheets do not adhere to each other under heat sealing, the loop may simply be peeled up from the top sheet. The inner surfaces of the sheets will have been sealed to each other to form an envelope. Vacuum integrity is provided even where the loop was folded over. Additional heat seals 30' may be provided in order to trim the pouch to desired size. An opening is left at one end of the envelope for inserting the parachute. The four transfer links thereof are positioned within the pouch 16 and the bridle 20 within the neck 14 prior to closing the envelope for evacuation. Circle welds 24 within the openings in the links and bridle prevent them from being displaced during evacuation or thereafter and provide for external attachment.

The corresponding pouch in the outer envelope is formed prior to sealing the remainder of the envelope as the polyurethane will heat seal to itself. Circle welds are formed therein after it is positioned about the inner pouch.

As shown in FIGS. 3-4, the final product is a compact, wedge-shaped structure capable of fitting easily within a conventional ejection seat head box. The neck 14 and pouch 16 are both maneuverable with respect to the remainder of the package to allow the parachute 22 to be externally connected to the drogue parachute and aircrewman, respectively, without the risk of sacrificing vacuum integrity. Once the external envelope 32 has been applied, the vacuum packed assembly will resist puncturing and loss of vacuum even when subjected to the extreme environments encountered by today's aircraft.

The vacuum-packed parachute 22 disclosed herein is specifically designed to be employed in conjunction with an aircraft ejection seat. It is stored within a head box having flexible flaps and no lid. The head box need not be vacuum sealed.

After initiation of pilot ejection, the drogue parachute(s) are released from the seat. The static line from the drogues to the head box flaps tightens and the flap lock is released. Flap opening is initiated by the parachute withdrawal. The vacuum envelopes are ruptured as the drogues exert a considerable force upon the actuation neck 14. The acute angle formed between the neck and the main portion of the double envelope allows it to tear easily. Once vacuum integrity is lost, the parachute is extracted as additional forces are exerted upon the envelopes, thereby ripping them apart. Canopy deployment begins, the deployment envelope extracted, and soon the suspension lines are deployed. Line stretch is achieved and the riser transfer hardware (including links 28) is removed from its position in the head box. Man/seat separation and canopy opening then occur and a normal rate of descent is established.

Additional lines of weakness may be incorporated across the neck 14 or wherever desirable. One such line 34 is shown in dotted lines in FIG. 1. It is provided on one or both of the vacuum envelopes as desired in such a manner that loss of vacuum will not be threatened prior to pilot ejection. Since the inner Saranex layers of the envelopes will not heat seal to nylon, a nylon film is inserted within the envelope and extending between the main body 12 thereof and the neck 14. A heat "seal" is then made across the neck thereby scoring and weakening its connection to the remainder of the envelope. The nylon film is removed and the bridle 20 inserted therein.

It will be appreciated that similar assemblies may be constructed for other compressible articles such as sleeping bags and life rafts. Since these articles are deployed in much different manners and are stored in containers of varying shapes, the finished products will of course be quite different in configuration.

Figure 6:
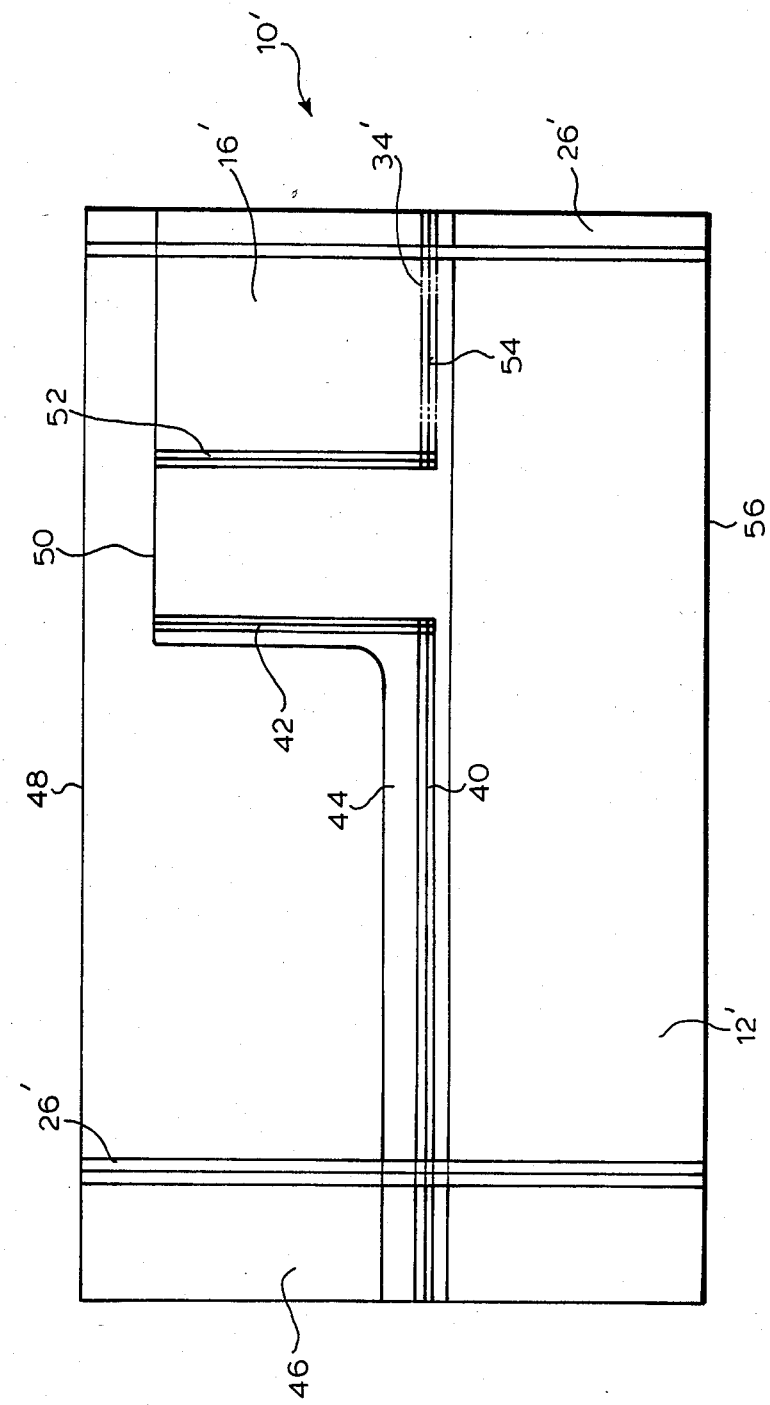
FIG. 6 is a top plan view of an alternative embodiment of the invention.

An alternative embodiment of the invention is shown in FIG. 6. A partially completed inner envelope 10' having a main body portion 12', a pair of opposing sealed edges 26', and a pouch 16' is provided. In this embodiment, the pouch 16' is defined by a loop formed in the upper ply of envelope material. (The terms upper and lower may be used interchangeably depending upon the position of the envelope.) It originally extended for the entire width of the envelope and had opposing edges defined by seals 26'. Seals 40 and 42 were then made and a rectangular area cut out. A small selvage 44 is shown as remaining adjacent to these seals 40,42. It is not a necessary part of the envelope 10'. Excess material 46 is also shown to the left of one of seals 26'. This would also be trimmed near the seal.

The envelope is closed at one end 48 as it is formed from a single sheet of material folded along this line. The top 50 of the pouch 16' is also closed due to the preferable loop construction. An alternative construction could be made by joining the opposing edge portions of a single sheet of material so that they extend perpendicularly therefrom in a T-shaped configuration. The extension would be folded down and the bag welded on opposite sides. The resulting construction would be a main body portion defined by two opposing seals and two opposing folds. The "pouch portion" would then have an upper opening through which an article could be inserted. It will be understood that the terms "main body portion" and "pouch" are used for descriptive purposes only and either one could be larger than the other.

Referring again to FIG. 6, the pouch 16' is divided into two compartments by an additional weld 52. The compartment to the right is further subdivided by a horizontal weld 54 in the middle of the opening between it and the main body portion. Dotted lines 34' are similar to those shown in FIG. 1. They are formed by placing two pieces of nylon through the bag opening as weld 54 is made. Upon removal of the nylon, two openings from the main body portion to this compartment are created.

An article may be inserted within the envelope through the large opening 56 between seals 26'. A small opening (not shown) is left so that air may be evacuated. All interior portions of the envelope are in fluid communication. The pouch may be maneuvered in either direction about the axis of welds 40 and 54.

It will be appreciated that the invention may include any number of pouches of the same or different sizes depending upon the application to which it is put. They may be formed at any selected location and include any number of compartments.

What is claimed is:

1. A three-dimensional vacuum container comprising upper and lower walls of flexible, substantially gas-impermeable material, said upper and lower walls being secured to each other along opposing sealing lines and defining a first envelope portion, said upper wall including an integral loop therein defining a second envelope portion in fluid communication with said first envelope portion, said loop having a closed end and a pair of opposing sealed edges, each of said sealed edges extending between said closed end and said first envelope portion with at least one of said sealed edges positioned between said opposing sealing lines, said second envelope portion being pivotable with respect to said first envelope portion along a line at which it adjoins said first envelope portion such that it may be positioned against said upper wall upon being pivoted about an axis defined by said line.

2. A container as defined in claim 1 wherein said closed end is defined by a fold in said loop.

3. A container as defined in claim 1 including an additional seal between the walls of said loop and extending at least partially between said closed end and said first envelope portion, thereby dividing said second envelope portion into two compartments.

4. A container as defined in claim 1 including a seal extending between said opposing sealed edges of said loop to provide additional rigidity thereto.

5. A container as defined in claim 1 wherein said first envelope portion includes a closed edge defined by a fold in said material and extending between said opposing sealing lines.

6. A container as defined in claim 5 wherein said first and second envelope portions are made from a single sheet of said material.

7. A container as defined in claim 1 wherein said sealed edges each terminate at said line adjoining said first and second envelope portions.

8. A container as defined in claim 7 wherein said sealed edges run in the same general directions as said opposing sealing lines.

9. A container as defined in claim 1 wherein both of said sealed edges are positioned between said opposing sealing lines.

10. A vacuum-packed parachute assembly comprising a three-dimensional vacuum container including upper and lower walls of flexible, substantially gas-impermable material, said upper and lower walls being secured to each other along opposing sealing lines and defining a first envelope portion, said upper wall including an integral loop therein defining a second envelope portion in fluid communication with said first envelope portion, said loop having a closed end and a pair of opposing sealed edges, each of said sealed edges extending between said closed end and said first envelope portion with at least one of said sealed edges positioned between said opposing sealing lines, said second envelope portion being pivotable with respect to said first envelope portion along a line at which it adjoins said first envelope portion such that it may be positioned against said upper wall upon being pivoted about an axis defined by said line, a parachute positioned within said container, a part of said parachute being within said first envelope portion and part within said second envelope portion.

11. An assembly as defined in claim 10 wherein said parachute includes at least one transfer link, said transfer link being positioned within said second envelope portion.

12. An assembly as defined in claim 10 wherein said closed end is defined by a fold in said loop.

13. An assembly as defined in claim 12 including a seal extending across said closed end to provide additional rigidity to said loop.

14. An assembly as defined in claim 10 wherein said container is made from a single sheet of material.

15. An assembly as defined in claim 10 wherein said sealed edges run in the same general directions as said opposing sealing lines.

16. An assembly as defined in claim 10 wherein both of said sealed edges are positioned between said opposing sealing lines.

* * * * *